United States Patent [19]
Onoguchi

[11] Patent Number: 5,694,483
[45] Date of Patent: Dec. 2, 1997

[54] MEASUREMENT FACE EXTRACTION APPARATUS AND METHOD

[75] Inventor: Kazunori Onoguchi, Osaka-fu, Japan

[73] Assignee: Kabushiki Kaisha Toshiba, Japan

[21] Appl. No.: 469,417

[22] Filed: Jun. 6, 1995

[30] Foreign Application Priority Data

Jun. 13, 1994 [JP] Japan ............... 6-130527

[51] Int. Cl.⁶ .............. G06K 9/32; G06K 9/62; G01N 21/86; G01B 9/00
[52] U.S. Cl. .............. 382/154; 382/294; 250/561; 364/560
[58] Field of Search ............... 382/154, 199, 382/286, 294, 285; 364/560; 348/142; 358/107; 250/561

[56] References Cited

U.S. PATENT DOCUMENTS

| | | | |
|---|---|---|---|
| 4,825,393 | 4/1989 | Nishiya | 382/154 |
| 5,202,928 | 4/1993 | Tomita et al. | 382/154 |
| 5,446,798 | 8/1995 | Morita et al. | 382/154 |
| 5,487,116 | 1/1996 | Nakano et al. | 382/154 |
| 5,528,194 | 6/1996 | Ohtani et al. | 382/154 |

OTHER PUBLICATIONS

"Dynamic Vision Systems on Intelligent Robots and Systems," *IEEE/RSJ International Workshop on Intelligent Robots and Systems*, Sep. 4-6, 1980, Volker Graefe, pp. 12-13.

"Vision and Navigation for the Carnegie-Mellon Navlab," *IEEE Transaction on Pattern Analysis and Machine Intelligence*, vol. 10, No. 3, May 1988, Charles Thorpe, et al., pp. 362.372.

"A Visual Navigation System for Autonomous Land Vehicles",: *IEEE Journal of Robotics and Automation*, vol. RA-3, No. 2, Apr. 1987, Allen M. Waxman, et al., pp. 124-141.

*Primary Examiner*—Andrew Johns
*Assistant Examiner*—Monica S. Davis
*Attorney, Agent, or Firm*—Graham & James LLP

[57] ABSTRACT

A measurement face extraction apparatus extracts a measurement face such as a road area in three-dimensional space. The measurement face is continuously located in the three-dimensional space. In the apparatus, two cameras input two images each of which includes the measurement face. A conversion unit calculates an equation of a projection plane corresponding to the measurement face and projects each position of each image onto the projection plane. A memory stores image information of each position of the two images by unit of projected position on the projection plane. An extraction unit, extracts each projected position for which the image information of the two images are similar from each projected position of the memory as the measurement face on the projection plane.

15 Claims, 13 Drawing Sheets

MEASUREMENT FACE EXTRACTION APPARATUS AND METHOD

BACKGROUND OF THE INVENTION

1. Field of the Invention

The present invention relates to a measurement face extraction apparatus and method for extracting a measurement face, such as a road area, continuously located in a three dimensional space.

2. Description of the Related Art

By a conventional technique, the area of a vehicle road surface, i.e. road area, is extracted from one camera image in accordance with information about color, texture etc. For example, a gray-color area having a low intensity in the image is extracted as the road area. Alternatively, two white lines which are both edges of road are detected and a no-texture area between the edges of the road is extracted from the image as the road area. Thus, by such techniques, the road area is extracted by two-dimensional image processing.

However, in the case of an outdoor-camera image, color and intensity level can change according to the weather even if the camera image is taken from the same vantage point. Furthermore, when a shadow, e.g., of trees, falls on the road, the texture of the road area also varies. In other words, it is difficult to extract the road area correctly in the case of two dimensional-image processing by using color and texture information.

Therefore, in accordance with conventional techniques, in the case of color-extraction and texture (edge)-extraction, plural parameters for fine weather, cloudy weather and rainy weather are prepared and the plural parameters are used to perform image processing in accordance with changes of weather.

However, there are innumerable image patterns whose color and texture (edge) are changed in accordance with changes of weather. Therefore, it is impossible to prepare plural parameters to deal with all changes of weather. Furthermore, since conventional techniques extract road areas only by two dimensional image information, there can result that a gray colored building by the side of the road is extracted by mistake as the road area. In short, when an obstacle object whose color and texture are similar to those of the road is positioned adjacent to the road, the road area may not be extracted correctly from the camera image.

SUMMARY OF THE INVENTION

It is an object of the present invention to provide a measurement face extraction apparatus and method that is not subject to the aformentioned problems and disadvantages.

It is an other object of the present invention to provide a measurement face extraction apparatus and method for extracting road areas correctly from camera-images even if the weather changes.

It is a further object of the present invention to provide a measurement face extraction apparatus and method for extracting road areas correctly from camera-images even if an obstacle object whose color and texture are similar to those of a road is positioned adjacent to the road.

According to the present invention, there is provided

Measurement face extraction apparatus, comprising:
a plurality of image input means for respectively inputting a plurality of images each of which includes a measurement face, wherein the measurement face is located in a three-dimensional space;
conversion means, responsive to the plurality of images, for calculating a projection plane corresponding to the measurement face in the three-dimensional space, and for projecting onto the projection plane positions of each of the plurality of images;
memory means for storing image information of each projected image position by unit of projected position on the projection plane; and
extraction means for extracting from said memory means at least one of the projected positions for which the stored image information of the plurality of images are similar as part of the measurement face.

Further in accordance with the present invention, there is provided

Measurement face extraction method, comprising the step of:
inputting a plurality of images which respectively include a measurement face, wherein the measurement face is located in a three-dimensional space;
calculating a projection plane corresponding to the measurement face in the three-dimensional space
projecting onto the projection plane positions of each of the plurality of images;
storing in memory means image information of each projected imege position by unit of projected position on the projection plane; and
extracting from the memory means at least one of the projected positions for which the stored image information of the plurality of images are similar as part of the measurement face.

DETAILED DESCRIPTION OF THE PREFERRED EMBODIMENTS

As used herein, the term "face" refers to an open or predetermined physical area, and the term "measurement face" refers to the particular area it is desired to extract from image data.

In the present embodiment, it is assumed that the road area is extracted from stereo images including the road, which are inputted by cameras mounted on a vehicle.

Figure 1:
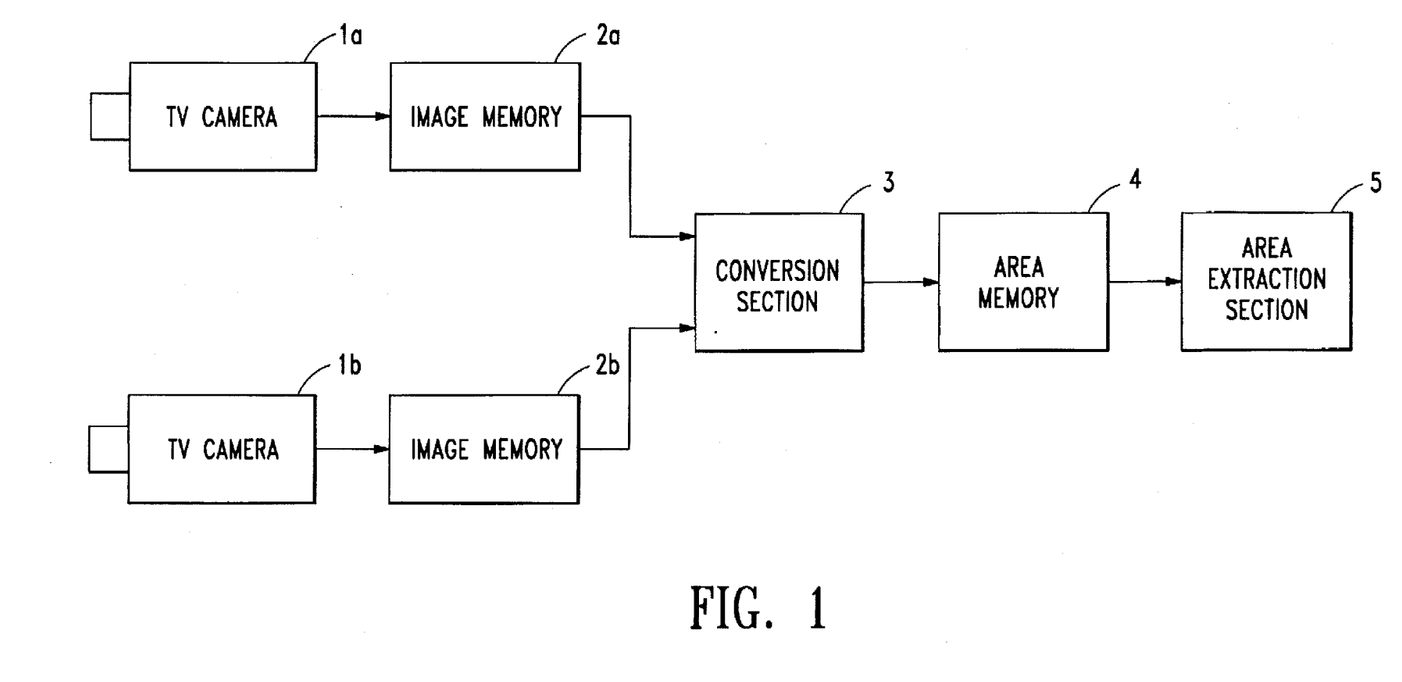
FIG. 1 is a block diagram of a measurement face extraction apparatus according to an embodiment of the present invention.

FIG. 1 is a block diagram of a measurement face extraction apparatus according to the present embodiment. The measurement face extraction apparatus includes two TV cameras (1a, 1b), two image memories (2a, 2b), a conversion section 3, an area memory 4 and an area extraction section 5. In the TV cameras (1a, 1b), the optical axes of the two cameras are parallel to each other. The TV camera 1a and the TV camera 1b each receive a camera-image (left image and right image), which includes a road area. The camera-images are stored in the image memory 2a and the image memory 2b, respectively. The conversion section 3 calculates the equation of a plane corresponding to the road area in three-dimensional space. Then, the conversion section 3 projects each pixel of the two camera-images onto the projection plane which is represented by the equation. In the area memory 4, a memory plane corresponds to the projection plane by unit of memory address. The conversion section 3 writes image information of each pixel of the two camera-images by unit of address corresponding to each projection position on the projection plane in the area memory 4. The area extraction section 5 scans the image information in the area memory 4 and extracts a group of addresses corresponding to a road area from the area memory 4 according to similarity of the image information.

Figure 2:
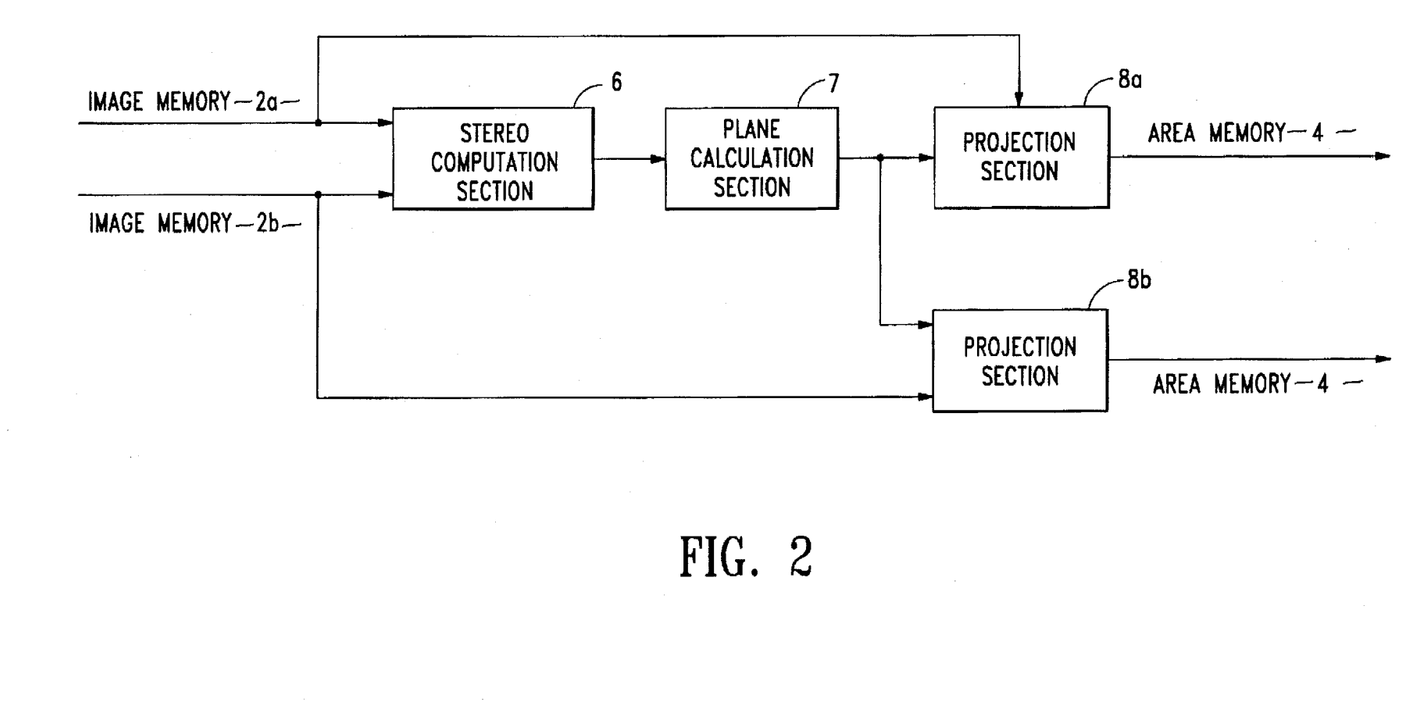
FIG. 2 is a block diagram of a conversion section including a stereo computation section according to the embodiment of the present invention.

FIG. 2 is a block diagram of the conversion section of the measurement face extraction apparatus according to the present embodiment. In FIG. 2, a stereo computation section 6 reads a pair of images (left image and right image) from the image memory 2a and the image memory 2b, respectively. Then, the stereo computation section 6 extracts edges of road area from the pair of images. The edges of road area are extracted as white lines on both sides of the road. The "white lines" are not limited to lines painted on the road but can also include contours such as curbs that define the edge of the road.

Figure 3:
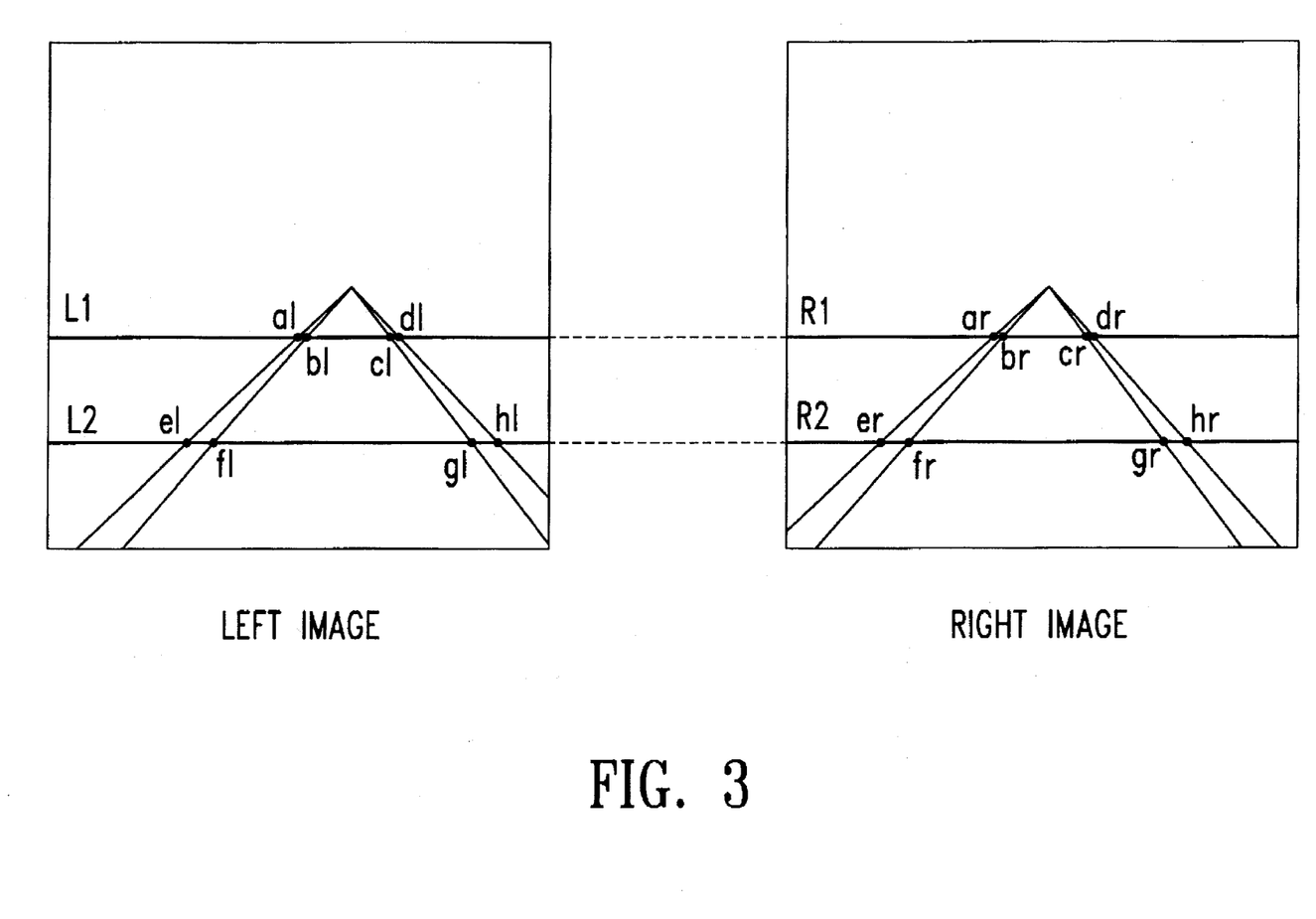
FIG. 3 is a schematic diagram of stereo images on which edge points of a road area are extracted.
Figure 4:
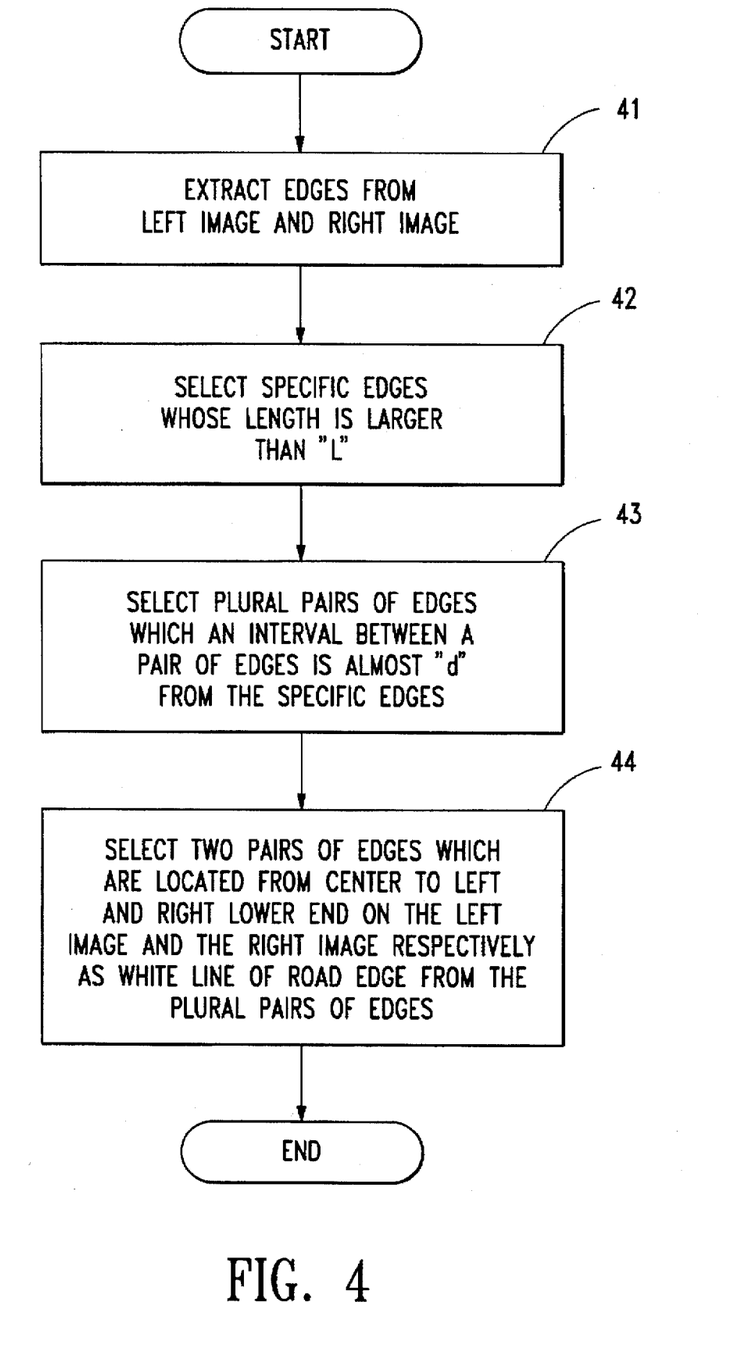
FIG. 4 is a flowchart for a process of extraction of the edge points.

FIG. 3 is a schematic diagram of sample points in the left image and the right image. FIG. 4 is a flow chart for the process of extracting the edges of the road in the stereo computation section 6.

Referring to FIG. 3 and FIG. 4, a method of extracting two pairs of white lines corresponding to edges of a road will be explained in detail. First, edges (contour lines) are extracted from the left image and the right image respectively (step 41). Then, specific edges each of whose length is longer than a threshold "L" are selected from the extracted edges (step 42). Next, plural pairs of edges each having a distance therebetween that is less than or equal to a threshold distance "d" (a pair of two edges is almost parallel) are extracted from the specific edges (step 43). Last, as shown in FIG. 3, two pairs of edges which are located from center to left lower end and right lower end of each image are selected (step 44). The two pairs of edges are white lines both representing edges of the road area.

Figure 5:
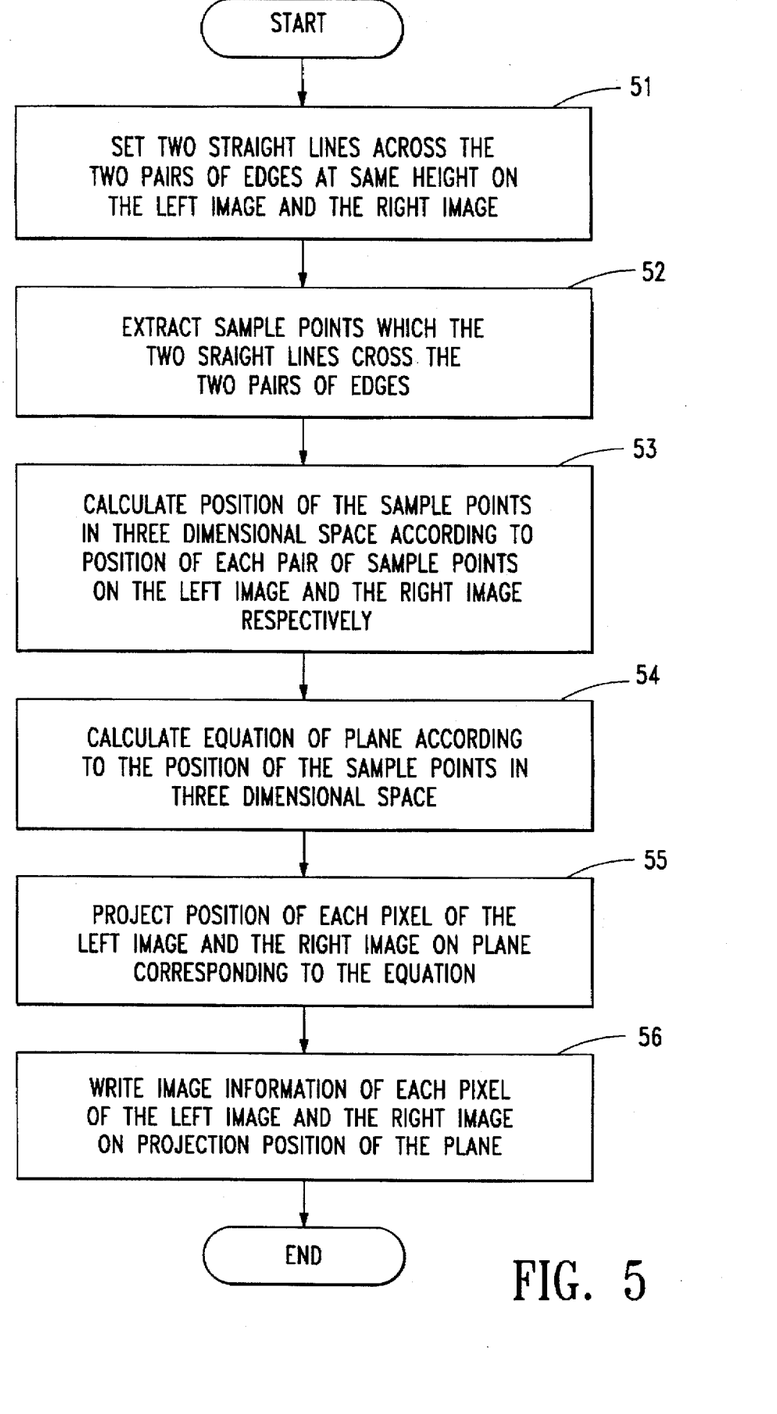
FIG. 5 is a flowchart of processing of a conversion section according to the embodiment of the present invention.

Next, the stereo computation section 6 extracts sample points from the two pairs of edges on each image and calculates the positions of the sample points in three-dimensional space. Then, a plane calculation section 7 calculates the equation of a plane according to the positions of the sample points. A projection section 8a and a projection section 8b respectively project the position of each pixel of the left image and the right image onto a plane corresponding to the equation. Then, the projection section 8a and the projection section 8b respectively write into the area memory 4 image information of each pixel of the left image and the right image as to projection position on the plane. FIG. 5 is a flow chart of the processing of the stereo computation section 6 (after extracting edges of the road area), the plane calculation section 7 and the projection sections (8a, 8b). First, as shown in FIG. 3, the stereo computation section 6 sets two straight lines across the two pairs of edges at the same height on the left image and the right image (step 51). In FIG. 3, two straight lines "L1, L2" are set on the left image and two straight lines "R1,R2" are set on the right image. Then, the stereo computation section 6 extracts intersection or cross points between the two straight lines and the white lines (edges of the road area) on the left image and the right image (step 52). Each cross point on the left image corresponds to each cross point on the right image. In this way, a pair of cross points on the left image and the right image is determined as a sample point.

For example, in FIG. 3, sample points (al,ar), (bl,br), (cl,cr), (dl,dr), are extracted on straight line "L1, R1", and sample points (el,er), (fl,fr), (gl,gr), (hl,hr) are extracted on straight line "L2, R2". Next, the stereo computation section 6 calculates the positions of of the sample points in three-dimensional space according to the position of the sample points on the left image and the right image (step 53). In this case, the position of the sample points in three-dimensional space are calculated by the following equations. For example, space position (X,Y,Z) of the sample point (al,ar) in three dimensional space is calculated as follows.

xl: x-coordinate of (al) based on center position of the left image yl: y-coordinate of (al) based on center position of the left image xr: x-coordinate of (ar) based on center position of the right image yr: y-coordinate of (ar) based on center position of the right image f: the focal distance of TV camera a: the distance between TV camera 1a and TV camera 1b $$X = \frac{a}{2} \cdot \frac{xr+xl}{xr-xl}, Y = \frac{a}{2} \cdot \frac{yr+yl}{yr-yl}, Z = \frac{fa}{xr-xl}$$

Next, the plane calculation section 7 calculates an equation of plane according to the space position of the sample points in three-dimensional space (step 54). In this case, the equation of plane "ax+by+cz+d=0" is determined by the "least square method" as follows.

$(x_1,y_1,z_1)$ : space position of sample point (al,ar)

$(x_2,y_2,z_2)$ : space position of sample point (bl,br)

$(x_n,y_n,z_n)$ : space position of sample point (hl,hr)

The equation of plane "ax+by+cz+d=0" is represented by following matrix.

$$\begin{pmatrix} x_1 & y_1 & z_1 & 1 \\ x_2 & y_2 & z_2 & 1 \\ \cdot & \cdot & \cdot & \cdot \\ \cdot & \cdot & \cdot & \cdot \\ \cdot & \cdot & \cdot & \cdot \\ x_n & y_n & z_n & 1 \end{pmatrix} \begin{pmatrix} a \\ b \\ c \\ d \end{pmatrix} = \begin{pmatrix} 0 \\ 0 \\ \cdot \\ \cdot \\ \cdot \\ 0 \end{pmatrix}$$

Therefore, coefficients "a,b,c,d" of the equation are calculated as follows.

$$\begin{pmatrix} a \\ b \\ c \\ d \end{pmatrix} = \begin{pmatrix} x_1 & y_1 & z_1 & 1 \\ x_2 & y_2 & z_2 & 1 \\ \cdot & \cdot & \cdot & \cdot \\ \cdot & \cdot & \cdot & \cdot \\ \cdot & \cdot & \cdot & \cdot \\ x_n & y_n & z_n & 1 \end{pmatrix}^{-1} \begin{pmatrix} 0 \\ 0 \\ \cdot \\ \cdot \\ \cdot \\ 0 \end{pmatrix}$$

Figure 6:
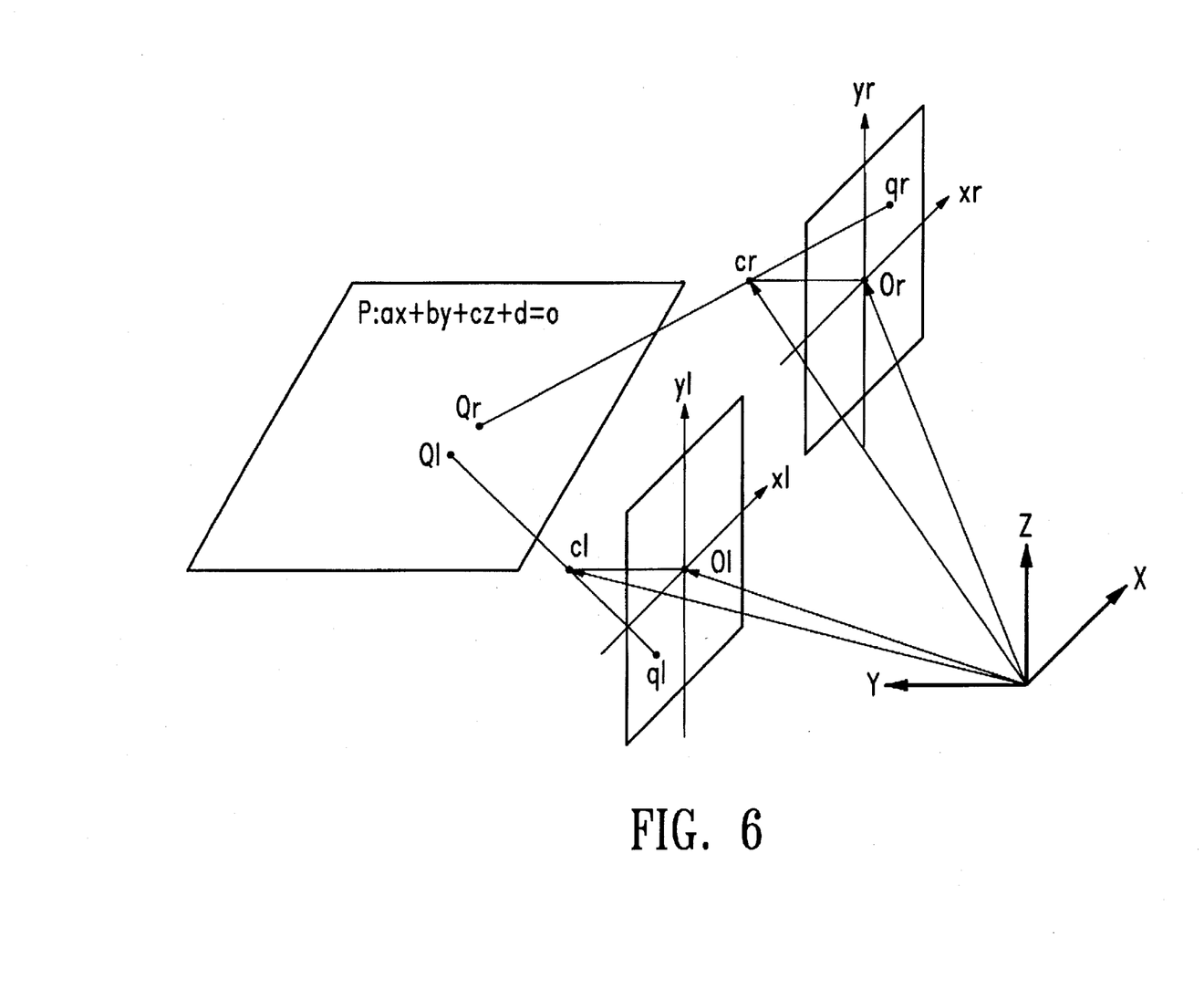
FIG. 6 is a schematic diagram of processing of a projection method according to the embodiment of the present invention.

Next, the projection section 8a and the projection section 8b respectively project the position of each pixel of the left image and the right image onto the plane represented by the equation of the plane (step 55). FIG. 6 is a schematic diagram for explanation of the projection method. In FIG. 6, the coordinate system of the stereo cameras is "O-XYZ". Center points of the left image and the right image are "Ol,Or", respectively. The focal points of the left camera and right camera are "cl,cr", respectively. A point "ql" on the left image is projected to a point "Ql" on the plane P. A point "qr" on the right image is projected to apoint "Qr" on the plane P. The coordinate system based on the center point of the left image is "Xl-Yl". The coordinate system based on the center point of the right image is "Xr-Yr". A vector corresponding to a pixel in the Xl-axis direction, based on the center point of the left image is "nlx". A vector corresponding to a pixel in the Yl-axis direction, based on the center point of the left image is "nly". A vector cerresponding to a pixel in the Xr-axis direction, based on the center point of the right image is "nrx". A vector corresponding to a pixel in the Yr-axis direction, based on the center position of the right image is "nry". Thus, generally, vector nlx,nly, nrx and nry are unit vectors for their corresponding x and y axes. The position of "ql" on the left image is "(Klx,Kly)". The position of "qr" on the right image is "(Krx,Kry)".

Next, the position of "Ql" in the coordinate system of the stereo cameras O-XYZ is calculated as follows. First, the relation equation of "ql" is represented as follows.

$$\overrightarrow{OQl} = \overrightarrow{Oql} + t(\overrightarrow{Ocl} - \overrightarrow{Oql})$$

$$\overrightarrow{Oql} = \overrightarrow{Ool} + klx \cdot \overrightarrow{nlx} + Kly \cdot \overrightarrow{nly}$$

According to the calibration of the stereo cameras, the following values are previously determined. (The calibration is the relative position between the coordinate system of stereo camera O-XYZ and the coordinate system of each image Xl-Yl,Xr-Yr.)

$$\overrightarrow{Ool} = (xol,yol,zol)$$

$$\overrightarrow{Ocl} = (xcl,ycl,zcl)$$

$$\overrightarrow{nlx} = (xnlx,ynlx,znlx)$$

$$\overrightarrow{nly} = (xnly,ynly,znly)$$

The equation of a straight line between the position ql and the position Ql is represented as follows.

$$X=Xol+Klx\cdot Xnlx+Kly\cdot Xnly+t(Xcl-Xol-Klx\cdot Xnlx-Kly\cdot Xnly)$$

$$Y=Yol+Klx\cdot Ynlx+Kly\cdot Ynly+t(Ycl-Yol-Klx\cdot Ynlx-Kly\cdot Ynly)$$

$$Z=Zol+Klx\cdot Znlx+Kly\cdot Znly+t(Zcl-Zol-Klx\cdot Znlx-Kly\cdot Znly)$$

The above three equations are assigned to variables "x,y,z" of the equation of plane P:"ax+by+cz+d=o" to determine variable "t". Then, by assigning "t" to the above three equations, the position of Ql in the coordinate system 0-XYZ is calculated as (Qlx, Qly, Qlz).

In the same way, the relation equation of "qr" is represented as follows.

$$\overrightarrow{OQr} = \overrightarrow{Oqr} + t(\overrightarrow{OCr} - \overrightarrow{Oqr})$$

$$\overrightarrow{Oqr} = \overrightarrow{OOr} + Krx \cdot \overrightarrow{nrx} + Kry \cdot \overrightarrow{nry}$$

According to the calibration of the stereo cameras, the following values are previously determined.

$$\overrightarrow{OOr} = (Xor,Yor,Zor)$$

$$\overrightarrow{OCr} = (Xcr,Ycr,Zcr)$$

$$\overrightarrow{nrx} = (Xnrx,Ynrx,Znrx)$$

$$\overrightarrow{nry} = (Xnry,Ynry,Znry)$$

The equation of a straight line between a position qr and a position Qr is represented as follows.

$$x=xor+Krx\cdot Xnrx+Kry\cdot Xnry+t(Xcr-Xor-Krx\cdot Xnrx-Kry\cdot Xnry)$$

$$y=yor+Krx\cdot ynrx+Kry\cdot ynry+t(ycr-yor-yrx\cdot ynrx-Kry\cdot ynry)$$

$$Z=Zor+Krx\cdot Znrx+Kry\cdot Znry+t(Zcr-Zor-Krx\cdot Znrx-Kry\cdot Znry)$$

The above three equations are assigned to variables "x,y,z" of the equation of plane P:"ax+by+cz+d=o" to determine variable "t". Then, by assigning "t" to the above three equations, the position of Qr in the coordinate system O-xyz is calculated as (Qrx,Qry,Qrz).

According to the above processing, the projection section 8a projects each pixel "ql" of the left image to position "Ql" on the plane P, and the projection section 8b projects each pixel "qr" of the right image to position "Qr" on the plane P.

Figure 7:
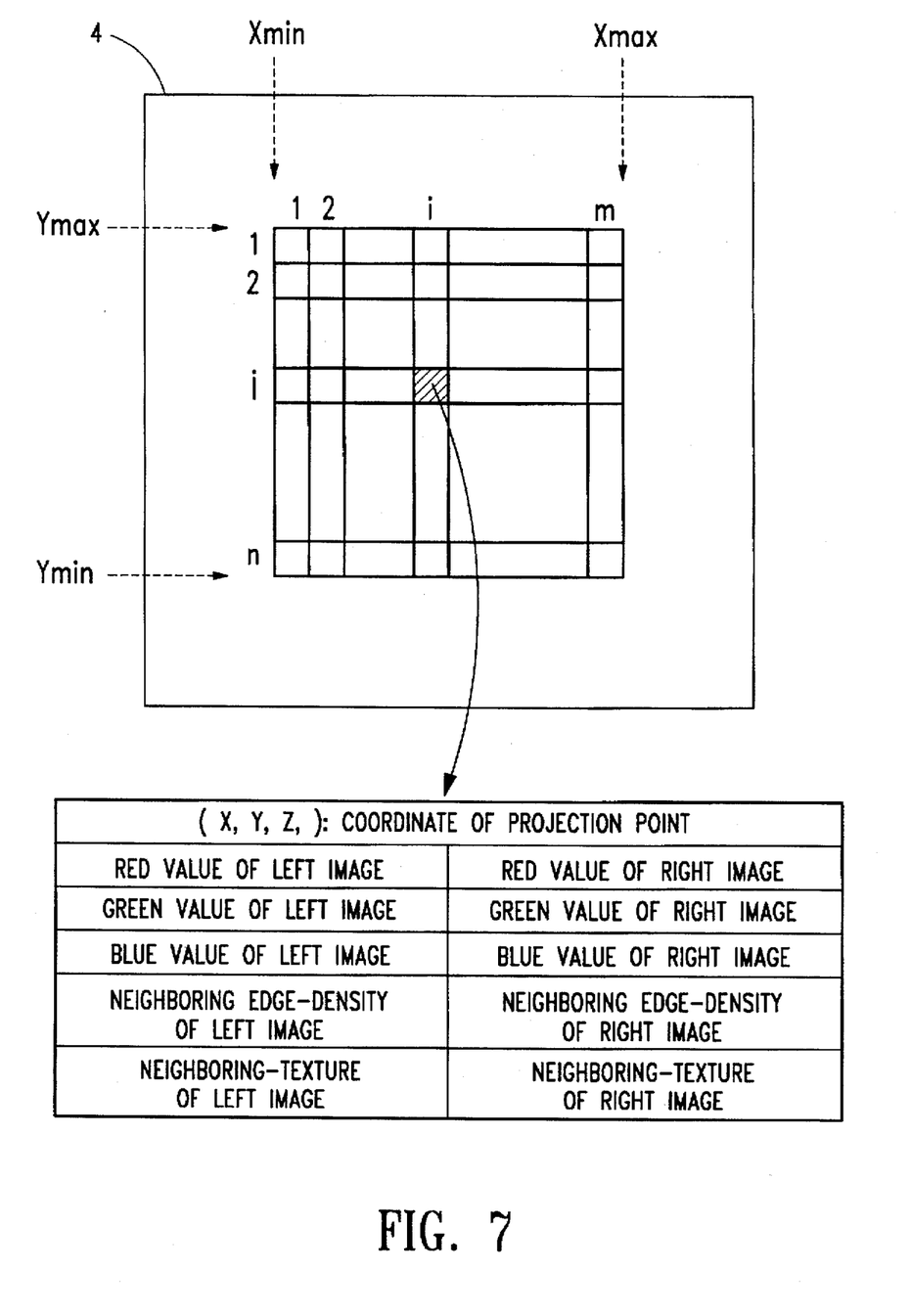
FIG. 7 is a schematic diagram of a relation of an area memory and image information according to the embodiment of the present invention.

Next, FIG. 7 is a schematic diagram of a memory address of the area memory 4. As shown in FIG. 7, the area memory includes addresses in a two-dimensional array m×n. It is assumed that the search area of the road corresponds to a predetermined square of the area memory 4.

The coordinates (X,Y) of the special square on the area memory 4 are represented as follows.

$$Xmin<X<Xmax, Ymin<Y<Ymax$$

In this case, the search area coorresponding to the X direction (Xmin<X<Xmax) is divided into m-parts and the search area corresponding to the Y direction (Ymin<Y<Ymax) is divided into n-parts. Then, the projection section 8a writes image information of each pixel of the left image in the projection position of the search area of the area memory 4 and the projection section 8b writes image information of each pixel of the right image in the projection position of the search area of the area memory 4 (step 56). For example, address (i,j) of the search area of the area memory 4 corresponds to a projection point whose coordinates (X,Y) are represented as follows.

$$Xmin + \frac{Xmax - Xmin}{m}(i - 0.5) < X < Xmin + \frac{Xmax - Xmin}{m}(i + 0.5)$$

$$Ymin + \frac{Ymax - Ymin}{n}(j - 0.5) < Y < Ymin + \frac{Ymax - Ymin}{n}(j + 0.5)$$

In short, the image information of the pixel corresponding to the projection point whose coordinate (X,Y) satisfies the above conditions is written in address (i,J) of the search area. As shown in FIG. 7, image information of pixels of both the left image and the right image are written by unit of one address.

Figure 8:
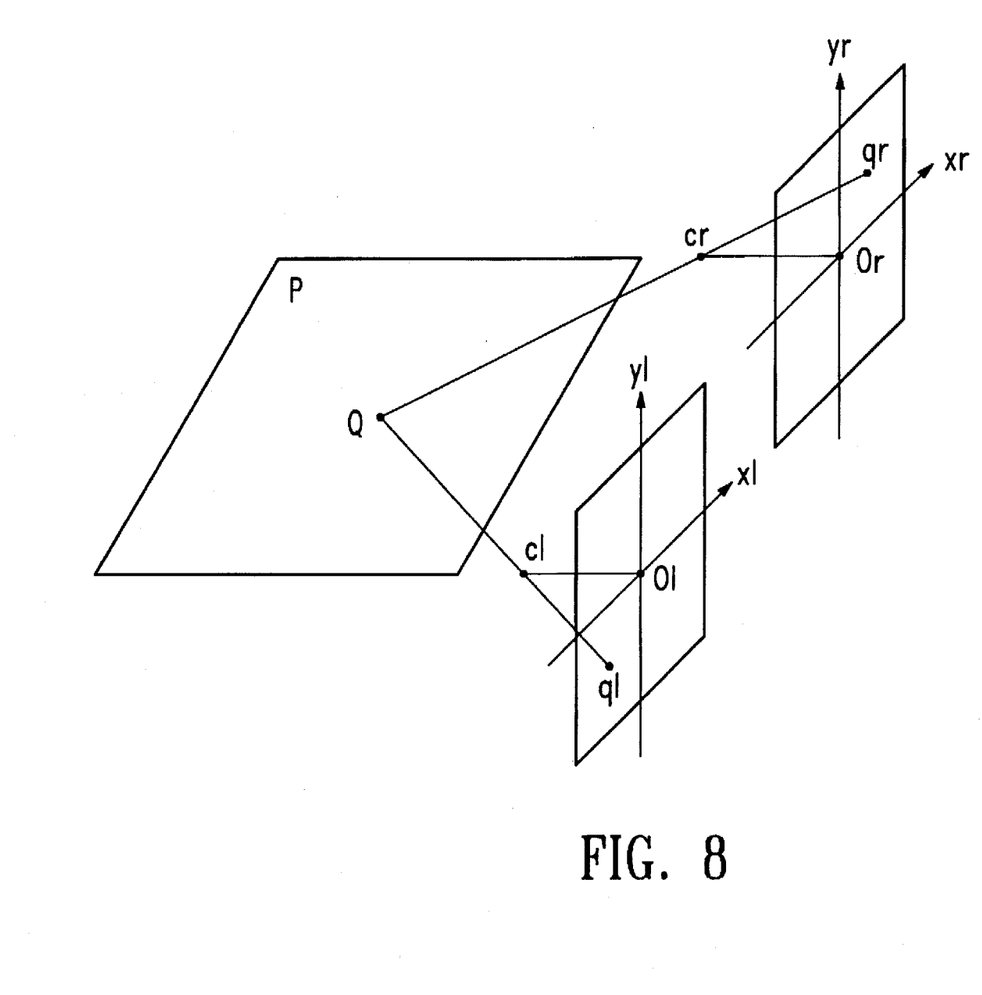
FIG. 8 is a schematic diagram of a relation of the area memory and the road area of the stereo images.

FIG. 8 is a schematic diagram for explanation of the relation among the pixel ql of the left image, the pixel qr of the right image and the projection point Q on the plane P. In FIG. 8, the pixel ql is located in the road area of the left image and the pixel qr is located in the road area of the right image. The projection plane P is represented as the equation of the plane of the road area in-three dimensional space. Therefore, the projection point Q of the pixel ql coincides with a projection point Q of the pixel qr on the projection plane P. In this case, image information for each of the pixel ql and the pixel qr is written in the memory address corresponding to the projection point Q of the area memory. As shown in FIG. 7, the image information includes the coordinate (x,y,z) of the projection point Q, the color-value (red, green, blue) of the pixel ql and the pixel qr, neighboring edge-density of the pixel ql and the pixel qr, and neighboring-texture information of the pixel ql and the pixel qr.

In these ways, the projection section 8a projects all pixels of the left image onto the projection plane (the area memory 4). Then, the projection section 8a selects projection points corresponding to the search area of the area memory and writes the image information of the pixels of the left image corresponding to the selected projection points by unit of address in the area memory 4. The projection section 8b projects all pixels of the right image onto the projection plane. Then, the projection section 8b selects projection points corresponding to the search area of the area memory and writes the image information of the pixels of the right image corresponding to the selected projection points by unit of addresses on the area memory 4.

Next, the area extraction section 5 extracts the addresses of the road area from the area memory 4 according to the image information of each address. First, the area extraction section 5 scans the image information of each address of the search area in the area memory 4 and extracts specific addresses not having image information from the search area. Then, the area extraction section 5 generates image information by linear interpolation of the image information neighboring to the specific address. In this case, as shown in FIG. 7, the image information (color-value, neighboring edge-density, neighboring-texture) of the left image of the specific address is generated by interpolating the image information of the left image neighboring to the specific address. The image information of the right image of a specific address is generated by interpolating the image information of the right image neighboring to the specific address. In these ways, the interpolated-image information is written in the specific address.

Next, the area extraction section 5 extracts from the area memory 4 addresses for which the image information of the left image is similar to the image information of the right image from. In this case,it is necessary to decide that color-value, neighboring edge-density and neighboring-texture of the left image are respectively similar to color-value, neighboring edge-density and neighboring-texture of the right image. In these ways, a group of addresses extracted represent a candidate for the road area in the area memory 4. (The meaning "similar" is that each difference of color value, neighboring edge-density, neighboring-texture between the left image and the right image is less than a predetermined threshold value respectively.)

Figure 9:
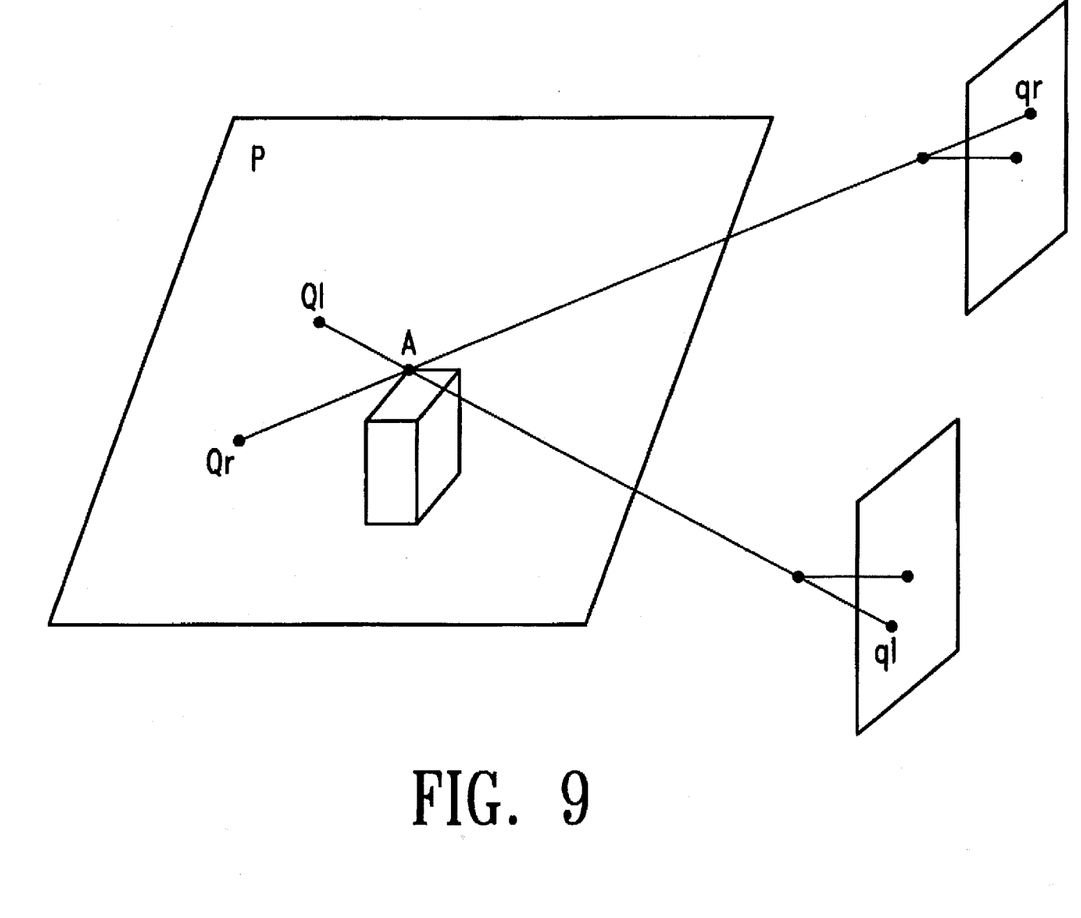
FIG. 9 is a schematic diagram of a relation of the area memory and an obstacle object in the stereo images.

FIG. 9 is a schematic diagram for explanation of the relation among the pixel ql of the left image, pixel qr of the right image, the projection point Ql and the projection point Qr of the plane P in the case that the pixel ql and the pixel qr correspond to a top part A of a building. As shown in FIG. 9, the height of the top part A of the building is different from the height of the road area (plane P). Therefore, the position of the projection point Ql is different from the position of the projection point Qr on the plane P. In short, as for the point A whose height is different from the height of the road area, the projection point of the point A of the left image is different from projection point of the point A of the right image on the plane P.

In other words, the memory address (i,j) having image information of a left image that is different from that of the right image does not correspond to the road area in the area memory 4.

Figure 10:
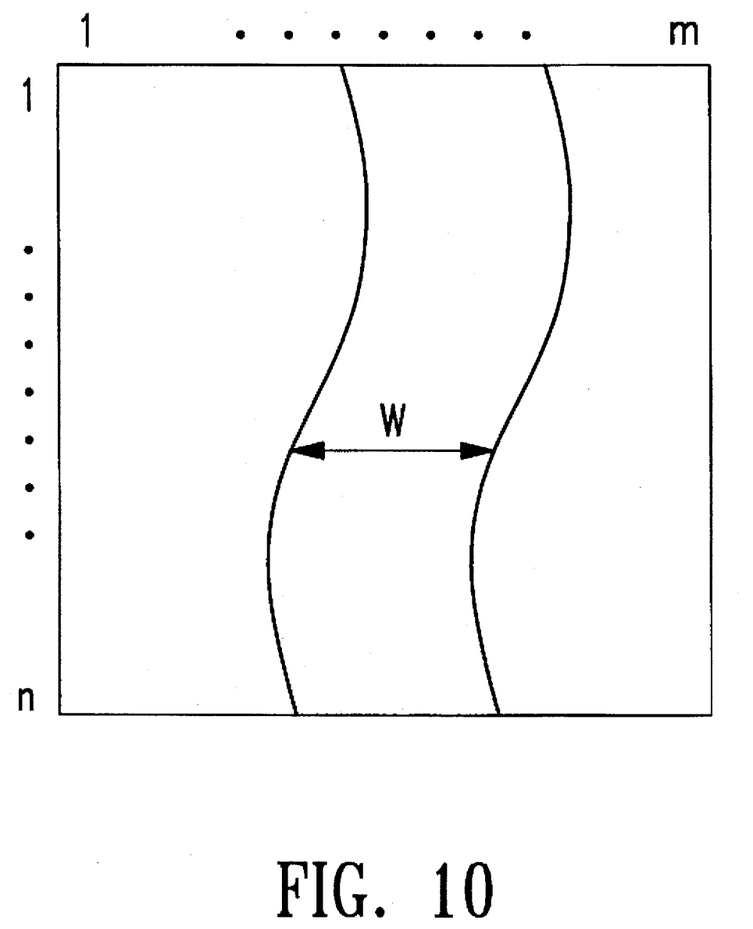
FIG. 10 is a schematic diagram of a road area whose width is previously determined in the area memory.

It may be assumed that the width of the road area "W" is previously determined and the road plane is almost parallel to the x-y plane of the coordinate system of the stereo camera. In this case, as shown in FIG. 10, the road area is a belt area whose width is W on the area memory 4. Therefore, after the candidate for the road area is extracted from the area memory, the candidate is determined to be the road area if the width of the candidate is W in the area memory.

Figure 11:
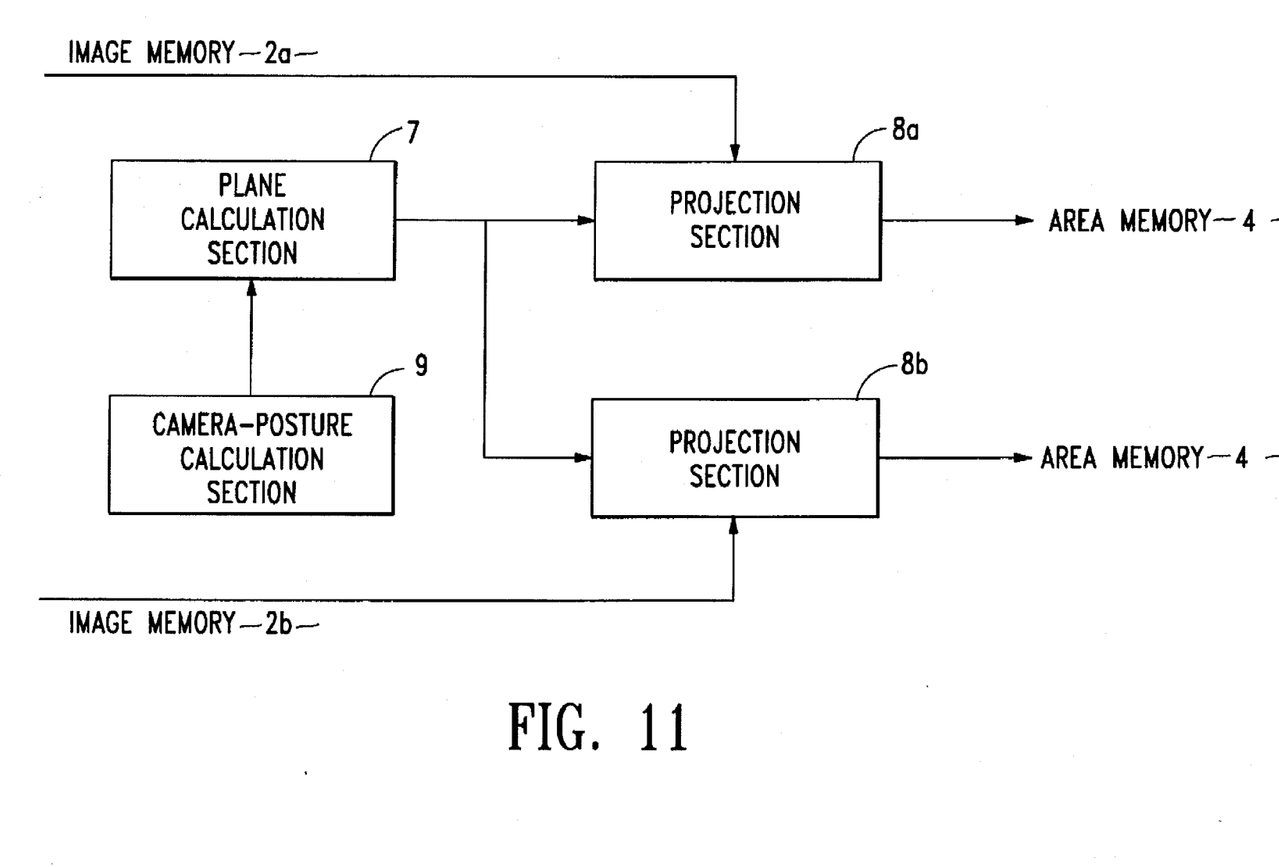
FIG. 11 is a block diagram of the conversion section including a camera posture calculation section according to another embodiment of the present invention.

FIG. 11 is a block diagram of the conversion section 3 of another embodiment of the invention. In FIG. 11, a camera-posture calculation section 9 calculates the posture of TV cameras (1a, 1b) for the road plane by using a potentiometer, an encoder, and a gyro. The plane calculation section 7 calculates the equation of the road plane according to the posture of TV cameras (1a, 1b). Then, the projection sections (8a, 8b) calculates projection points on the road plane in the same way as described above.

Figure 12:
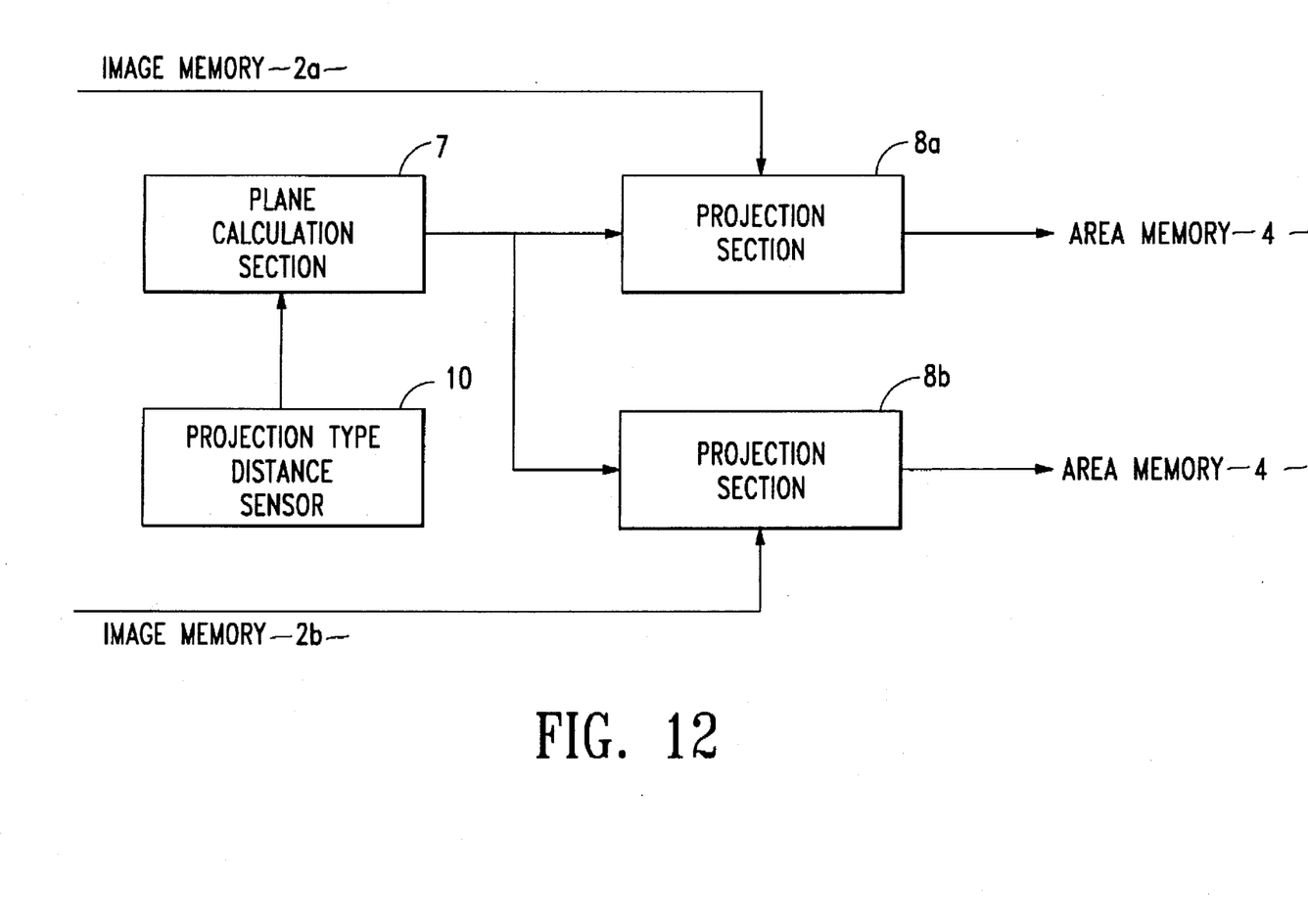
FIG. 12 is a block diagram of the conversion section including a distance sensor of the projection type according to another embodiment of the present invention.

FIG. 12 is a block diagram of the conversion section 3 of another embodiment of the invention. In FIG. 12, a projection-type distance sensor 10, such as a laser range finder, distance-measure, laser radar or supersonic wave sensor, calculates the position of sample points of the road plane. The plane calculation section 7 calculates the equation of the road plane according to the position of sample points. Then, the projection sections (8a, 8b) respectively calculates projection points on the road plane in the same way as described above.

Figure 13:
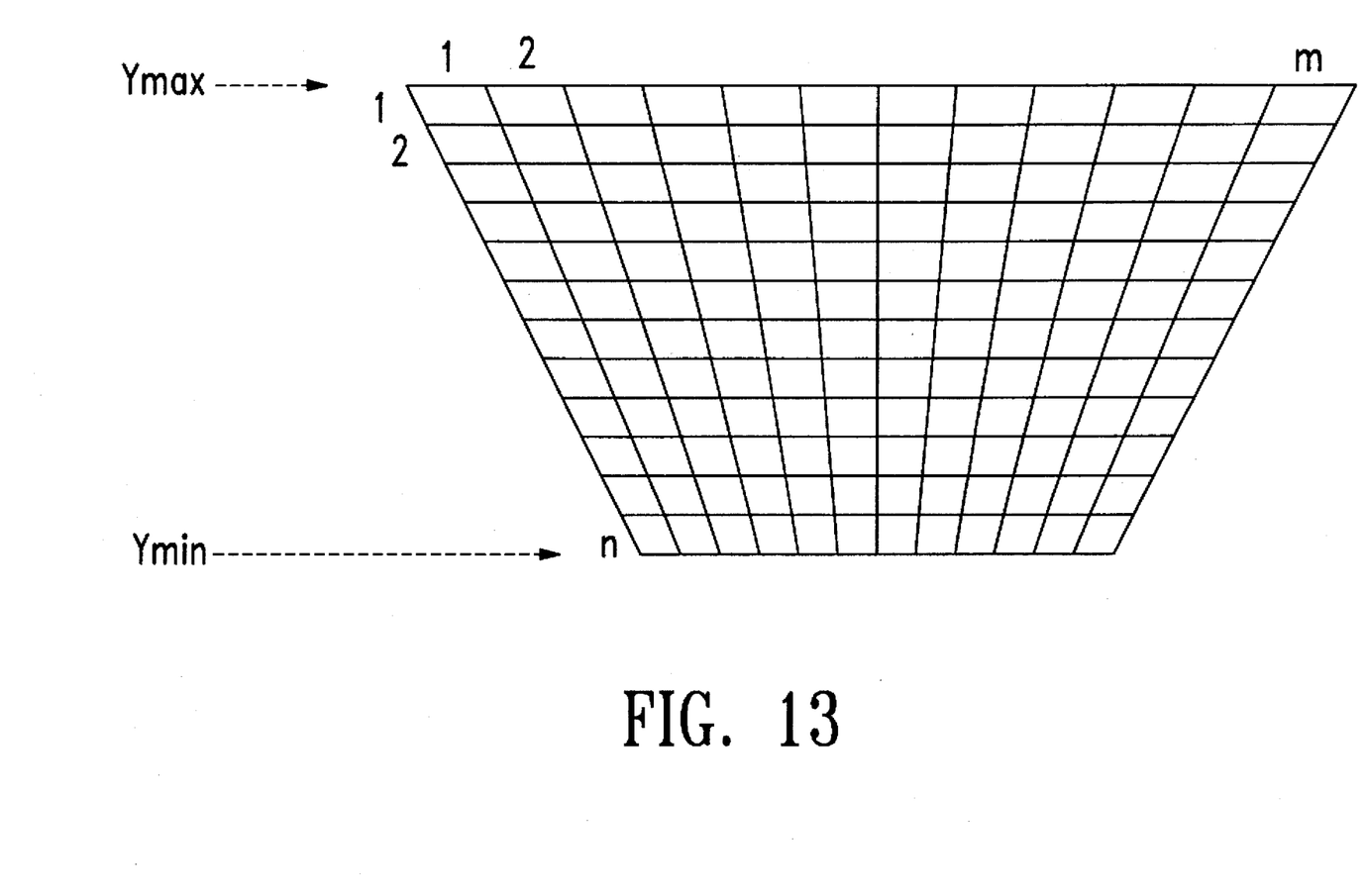
FIG. 13 is a schematic diagram of the area memory whose resolution of memory address is changed by a distance between TV-camera and projected position.

As described above with respect to FIG. 7, each unit of memory address (i,J) is defined of dividing equally the area memory 4. However, the actual area, which is remote from the origin of coordinates of the stereo cameras, is defined on the camera image as a small area in comparison with the actual area near to the origin of coordinates of the stereo cameras. In short, the resolution of the small area corresponding to the remote area has a relatively rough resolution in the camera image. On the other hand, the resolution of the large area near to the stereo cameras is detailed in the camera image. Therefore, as shown in FIG. 13, each unit of memory address, which is near to Ymin (near to the origin of the coordinates of the stereo cameras), is made by finely dividing the area memory. On the other hand, each unit of memory address, which is near to Ymax (remote from the origin of the coordinates of the stereo cameras), is made by coarsely dividing the area memory. In these ways, the unit of address of the area memory corresponds to the resolution of each area of the camera image without reducing the quantity of the image information in the area memory.

In the above described embodiments, the road area in three-dimensional space is a plane. However, the road area may be a curved surface. In this case, if only the equation of the curved surface "P(x,y,z)=o" is previously known, the road area as the curved surface is extracted in the same way as for the plane.

In the above described embodiments, the measurement face to be extracted is a road area. However, the measurement face is not limited to a road area. For example, a working stand in an FA environment can be extracted in the same manner as a road area in accordance with the present invention.

Additional advantages and modifications will readily occur to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. Measurement face extraction apparatus comprising:

image input means for inputting a left image and a right image of a three-dimensional space that includes a measurement face, the left image including a left image of the measurement face and the right image including a right image of the measurement face;

conversion means for extracting a plurality of pairs of points each consisting of a point from the left image of the measurement face and a corresponding point from the right image of the measurement face, for calculating positions in the three-dimensional space for the pairs of points, for utilizing the calculated positions to determine a projection plane in the three-dimensional space that include the measurement face, and for projecting each pixel position in the left image and the right image onto the projection plane;

memory means having a plurality of storage units, each storage unit corresponding to a portion of the projection plane and being capable of storing information regarding a pixel position from the left image and a pixel position from the right image projected onto the corresponding portion of the projection plane; and extraction means for extracting from said memory means a group of storage units in which stored information regarding a pixel position from the left image is similar within a predetermined threshold to stored information regarding a pixel position from the right image.

2. Measurement face extraction apparatus according to claim 1, wherein the measurement face is a road area.

3. Measurement face extraction apparatus according to claim 1, wherein the image input means comprises two television cameras.

4. Measurement face extraction apparatus according to claim 3, wherein said conversion means includes stereo computation means for extracting a plurality of pairs of edges corresponding to the measurement face from the left image and the right image, and for calculating a plurality of edge positions corresponding to the measurement face in the three-dimensional space in accordance with the plurality of pairs of edges.

5. Measurement face extraction apparatus according to claim 4, wherein said conversion means includes plane calculation means for calculating an equation of the projection plane corresponding to the measurement face in the three-dimensional space in accordance with the plurality of edge positions.

6. Measurement face extraction apparatus according to claim 5, wherein said conversion means includes projection means for calculating an equation of a straight line passing through a focus position of each said television camera and each pixel-position of the corresponding one of the left and right images in three-dimensional space, and for calculating a cross point where each straight line passes through the projection plane in accordance with the equation of the straight line and the equation of the projection plane, wherein the cross point is the projected pixel-position on the projection plane.

7. Measurement face extraction apparatus according to claim 6, wherein said memory means stores image information including at least one of color-value, neighboring edge-density and neighboring-texture of each pixel of each of the left and right images by unit of memory address corresponding to the projected position of each pixel on the projection plane.

8. Measurement face extraction apparatus according to claim 7, wherein said extraction means includes means for interpolating image information for memory addresses for which image information is not stored, in accordance with image information of a neighboring memory address of said memory means.

9. Measurement face extraction apparatus according to claim 8, wherein said extraction means extracts each memory address for which the stored image information of the left image and the right image are similar, the extracted memory addresses corresponding to the projected position of the measurement face on the projection plane.

10. Measurement face extraction apparatus according to claim 9, wherein said extraction means includes means for comparing a width of a group of the memory addresses extracted as the measurement face on the projection plane with a predetermined width value.

11. Measurement face extraction apparatus according to claim 7, wherein a portion of the memory means that corresponds to positions near the two television cameras is finely divided into storage units, and a portion of the memory means that corresponds to positions remote from the two television cameras is coarsely divided into storage units.

12. Measurement face extraction apparatus according to claim 5, wherein said conversion means includes camera-posture calculation means for calculating posture data of the two television cameras in the three-dimensional space for use in calculating the equation of the projection plane.

13. Measurement face extraction apparatus according to claim 1,
  wherein said conversion means includes distance sensor means for sensing a position of the measurement face in the three-dimensional space.

14. Measurement face extraction method comprising the steps of:
  inputting a left image and a right image of a three-dimensional space that includes a measurement face, the left image including a left image of the measurement face and the right image including right image of the measurement face;
  extracting a plurality of pairs of points, each pair consisting of a point from the left image of the measurement face and a corresponding point from the right image of the measurement face;
  calculating positions in the three-dimensional space for the pairs of points;
  calculating a projection plane in the three-dimensional space that includes the measurement face utilizing the calculated positions;
  projecting each pixel position in the left image and the right image onto the projection plane;
  storing in each of a plurality of storage units information regarding a pixel position in the left image and a pixel position in the right image projected onto the projection plane, wherein each storage unit corresponds to a portion of the projection plane; and
  extracting a group of storage units in which stored information regarding a pixel position in the left image is similar within a predetermined threshold to stored information regarding a pixel position in the right image.

15. A computer readable memory containing computer-readable instructions to extract a measurement face comprising:
  instruction means for causing a computer to input a left image and a right image of a three-dimensional space that includes a measurement face, the left image including a left image of the measurement face and the right image including a right image of the measurement face;
  instruction means for causing a computer to extract a plurality of pairs of points, each pair consisting of a point from the left image of the measurement face and a corresponding point from the right image of the measurement face;
  instruction means for causing a computer to calculate positions in the three-dimensional space for the pairs of points;
  instruction means for causing a computer to calculate a projection plane in the three-dimension space that includes the measurement face;
  instruction means for causing a computer to project each pixel position in the left image and the right image onto the projection plane;
  instruction means for causing a computer to store in each of a plurality of storage units information regarding a pixel position in the left image and a pixel position in the right image projected onto the projection plane, wherein each storage unit corresponds to an area of the projection plane; and
  instruction means for causing a computer to extract a group of storage units in which stored information regarding a pixel position in the left image is similar within a predetermined threshold to stored information regarding a pixel position in the right image.

* * * * *